(12) United States Patent
Shields et al.

(10) Patent No.: US 12,330,370 B2
(45) Date of Patent: Jun. 17, 2025

(54) 3D PRINTING SYSTEM FOR PREPARING A THREE-DIMENSIONAL OBJECT

(71) Applicant: Sulzer Management AG, Winterthur (CH)

(72) Inventors: Stephen Shields, The Woodlands, TX (US); Daniele Tammaro, Zürich (CH); Ulla Trommsdorff, Zürich (CH); Claudio Walker, Winterthur (CH)

(73) Assignee: Sulzer Management AG, Winterthur (CH)

( * ) Notice: Subject to any disclaimer, the term of this patent is extended or adjusted under 35 U.S.C. 154(b) by 894 days.

(21) Appl. No.: 17/270,500

(22) PCT Filed: Aug. 26, 2019

(86) PCT No.: PCT/EP2019/072702
§ 371 (c)(1),
(2) Date: Feb. 23, 2021

(87) PCT Pub. No.: WO2020/043660
PCT Pub. Date: Mar. 5, 2020

(65) Prior Publication Data
US 2021/0331389 A1    Oct. 28, 2021

(30) Foreign Application Priority Data
Aug. 30, 2018    (EP) ..................... 18191777

(51) Int. Cl.
*B29C 64/209* (2017.01)
*B29C 64/295* (2017.01)
(Continued)

(52) U.S. Cl.
CPC .......... *B29C 64/209* (2017.08); *B29C 64/295* (2017.08); *B29C 64/321* (2017.08);
(Continued)

(58) Field of Classification Search
CPC ................ B29C 64/209; B29C 64/295; B29C 64/321; B29C 64/106; B29C 64/194;
(Continued)

(56) References Cited

U.S. PATENT DOCUMENTS

| | | | |
|---|---|---|---|
| 4,473,665 A | 9/1984 | Martini-Vvedensky | |
| 5,340,433 A * | 8/1994 | Crump | B22F 3/115 |
| | | | 156/218 |

(Continued)

FOREIGN PATENT DOCUMENTS

| | | |
|---|---|---|
| CN | 102585278 A | 7/2012 |
| CN | 105 034 377 A | 11/2015 |

(Continued)

OTHER PUBLICATIONS

English Translation of WO 2018/157148 (Year: 2018).*

(Continued)

*Primary Examiner* — Galen H Hauth
*Assistant Examiner* — Baileigh Kate Darnell
(74) *Attorney, Agent, or Firm* — Global IP Counselors, LLP

(57) ABSTRACT

A three-dimensional printing system for preparing a three-dimensional object made at least partially of an expanded polymer includes a printing device configured to prepare an expandable polymer melt and deposit a strand of expandable, expanding or expanded polymer onto a surface and a three-dimensional movement device for to enable depositing of the strand of expandable, expanding or expanded polymer at a predetermined time at a precise position within the three-dimensional matrix. The printing device includes a feed section at an upstream end of the printing device, a heating section, a pressurizing section, a blowing agent supply line, a mixing section, a cooling section and a terminal printing head section at a downstream end of the (Continued)

printing device including a die configured to deposit the strand of the expandable, expanding or expanded polymer onto the surface.

14 Claims, 3 Drawing Sheets

(51) Int. Cl.
*B29C 64/321* (2017.01)
*B33Y 10/00* (2015.01)
*B33Y 30/00* (2015.01)
*B33Y 40/00* (2020.01)
*B29K 105/04* (2006.01)

(52) U.S. Cl.
CPC ............... *B33Y 10/00* (2014.12); *B33Y 30/00* (2014.12); *B33Y 40/00* (2014.12); *B29K 2105/048* (2013.01)

(58) Field of Classification Search
CPC ............. B29C 64/227; B29C 48/0012; B29C 48/362; B29C 48/387; B29C 48/05; B29C 48/30; B29C 48/911; B29C 44/50; B29C 44/022; B29C 44/3442; B29C 44/3446; B29C 44/36; B33Y 10/00; B33Y 30/00; B33Y 40/00; B33Y 70/00; B33Y 80/00; B29K 2105/048
See application file for complete search history.

(56) References Cited

U.S. PATENT DOCUMENTS

| | | | |
|---|---|---|---|
| 5,902,529 A * | 5/1999 | Ishikawa | B29C 48/67 366/89 |
| 9,200,129 B2 | 12/2015 | Czerwonatis et al. | |
| 10,759,096 B2 | 9/2020 | Smith et al. | |
| 11,117,294 B2 | 9/2021 | Holmes et al. | |
| 11,268,214 B2 | 3/2022 | Sano et al. | |
| 2005/0208168 A1 | 9/2005 | Hickerson et al. | |
| 2011/0281964 A1 | 11/2011 | Zmarsly et al. | |
| 2013/0295338 A1 | 11/2013 | Keating et al. | |
| 2016/0096320 A1* | 4/2016 | Bourgoyne | B33Y 40/00 264/50 |
| 2017/0253710 A1 | 9/2017 | Smith et al. | |
| 2017/0259474 A1 | 9/2017 | Holmes et al. | |
| 2019/0105813 A1 | 4/2019 | Bettermann | |
| 2020/0391417 A1 | 12/2020 | Smith et al. | |
| 2021/0154910 A1* | 5/2021 | Cheng | B29C 64/209 |
| 2021/0370561 A1 | 12/2021 | Holmes et al. | |

FOREIGN PATENT DOCUMENTS

| | | |
|---|---|---|
| CN | 106493968 A | 3/2017 |
| CN | 106977759 A | 7/2017 |
| CN | 107124873 A | 9/2017 |
| CN | 107530955 A | 1/2018 |
| DE | 10 2015 219 135 A1 | 4/2017 |
| EP | 3162531 A1 | 5/2015 |
| EP | 3 243 633 A1 | 11/2017 |
| WO | 2018093145 A1 | 5/2018 |

OTHER PUBLICATIONS

Chinese Office Action issued May 16, 2022 in corresponding Chinese Application No. 201980071144.7.
Chinese Search Report issued May 5, 2022 in corresponding Chinese Application No. 201980071144.7.
Indian Office Action issued Aug. 22, 2022 in corresponding Indian Application No. 202117007329.
Taiwanese Office Action issued Sep. 2, 2022 in corresponding Taiwanese Application No. 108131046.
Taiwanese Search Report issued Sep. 6, 2022 in corresponding Taiwanese Application No. 108131046.
Extended European Search Report issued Mar. 29, 2019 in corresponding European Patent Application No. 18191777.4, filed Aug. 30, 2018.
International Search Report and Written Opinion issued Nov. 18, 2019 in corresponding International Patent Application No. PCT/EP2019/072702, filed Aug. 26, 2019.
International Preliminary Report on Patentability issued Sep. 22, 2020 n corresponding International Patent Application No. PCT/EP2019/072702, filed Aug. 26, 2019.

* cited by examiner

3D PRINTING SYSTEM FOR PREPARING A THREE-DIMENSIONAL OBJECT

CROSS-REFERENCE TO RELATED APPLICATIONS

This application is a U.S. National Stage application of International Application No. PCT/EP2019/072702, filed Aug. 26, 2019, which claims priority to European Patent Application No. 18191777.4, filed Aug. 30, 2018, the contents of each of which are hereby incorporated herein by reference.

BACKGROUND

Field of the Invention

The present invention relates to a three-dimensional printing system for preparing a three-dimensional object made at least partially of an expanded polymer, such as of polystyrene foam, as well as to a method for preparing a three-dimensional object made at least partially of an expanded polymer.

Background Information

Expanded polymers, i.e. polymer foams, are cellular structures, which generally have a low density. Foams are divided in closed-cell foams, open-cell foams, mixed-cellular foams and integral foams. While closed-cell foams comprise cells, which are completely surrounded by the solid polymer material and which are filled with gas, the cells of open-cell foams are not completely surrounded by the solid polymer material and thus interconnected with each other. Due to this, open-cell foams cancan absorb liquid, such as water, whereas closed-cell foams do not. Mixed-cellular foams comprise open-cells as well as closed-cells, whereas integral foams have thick, non-cellular or at least essentially non-cellular outer walls and therebetween a cellular core, wherein the density reduces from the outer walls to the inner core essentially continuously.

Foams are easily formable, have a low tensile strength, have a high acoustic insulation property and are furthermore have a low thermal conductivity. Due to these properties, foams are easily workable and are applied in various commercial areas. For instance, closed-cell foams, such as those made of polystyrene or polyurethane, are used as thermal insulating materials in a plurality of sectors of industry, such as e.g. as building insulation materials. Other examples for the commercial application of foams are acoustic insulating materials, cushioning, mattresses, mats and sponges.

Foams cancan be made of nearly all commercially available polymers, such as of ethylene-vinyl acetate, of polyethylene, of nitrile rubber, of a copolymer of acrylonitrile and butadiene, of polychloroprene, of polyimide, of polyester, of polypropylene, of polystyrene, of polyurethane, of polylactic acid and of polyvinyl chloride.

Several conventional methods for producing foam articles are known. One example therefore is the direct injection expanded foam molding process, in which a pressurized polymer melt including a blowing agent is injected through nozzles into a mold. In the mold, in which a lower pressure is present than the pressure of the pressurized polymer melt, the blowing agent expands, thus forming the polymer foam in the desired shape. Another example is to incubate polymer granulates in an autoclave at an elevated temperature and under pressure with a blowing agent, such as carbon dioxide, before the pressure is released and the temperature lowered so as to foam the granulates to foam beads. These foam beads can then be injected into a mold, before the foam beads are heat fused therein into the desired shape by the application of pressure and steam. Still another example therefore is to form expandable polymer beads by extruding a pressurized, blowing agent including polymer melt through the dies of a die plate and by granulating the polymer melt strands directly behind the dies in an underwater granulator, in which the polymer melt is cooled under pressure so as to avoid an expansion of the polymer strand. The expandable polymer beads can then be foamed and fused in a mold into an article having the desired shape.

SUMMARY

Recently producing the foamed articles making use of three-dimensional (3D) printing has been proposed. This method has the advantage that no moldings, which are laborious and expensive to produce, are required. Moreover, 3D printing is fast, allows to change the material during the process and generates only very small amounts of waste.

CN 106493968 A discloses a method and an apparatus for producing a foamed product based on 3D printing. The apparatus comprises a 3D printer as molding unit, a supercritical infiltration unit and a foaming unit. While the supercritical infiltration unit comprises a preheater, a booster pump, a carbon dioxide storage tank and an infiltration vessel, the foaming unit is mainly composed of a steam generator, a foam box and a cover plate. The method comprises the following steps: firstly, printing a three-dimensional model of a polymer melt via the 3D printer; secondly, then putting the formed three-dimensional model into the infiltration vessel of the supercritical infiltration unit and infiltrating supercritical carbon dioxide and thirdly, carrying out steam foaming of the three-dimensional model in the foam box so as to obtain the foamed product.

It has been found that this process has several drawbacks. First, the process does not allow for the production of hybrid articles comprising foamed sections and non-foamed sections. Rather, this method only allows for the production of articles, which are completely and uniformly foamed. In addition, the foam structure and the density of the foamed product produced with this method cannot be satisfyingly controlled.

In view of this, the object underlying the present invention is to provide a 3D printing system and a method for preparing a three-dimensional object made at least partially of an expanded polymer, which is more flexible and which particularly enables control of the foam structure and the density of the foamed product and enables the production of hybrid articles comprising foamed sections and non-foamed sections.

In accordance with the present invention, this object is satisfied by providing a 3D printing system for preparing a three-dimensional object made at least partially of an expanded polymer comprising:
i) a printing device for preparing an expandable polymer melt and for depositing a strand of the expandable, expanding or expanded polymer onto a surface and
ii) a three-dimensional movement device for adjusting the position of the printing device in a predefined three-dimensional matrix so as to allow to deposit the strand of expandable, expanding or expanded polymer at a predetermined time at a precise position within the three-dimensional matrix, wherein the printing device comprises:
- a) a feed section at the upstream end of the printing device,
- b) a heating section,
- c) a pressurizing section,
- d) a blowing agent supply line,
- e) a mixing section,
- f) a cooling section and
- g) a terminal printing head section at the downstream end of the printing device including a die for depositing the strand of expandable, expanding or expanded polymer onto the surface, wherein the mixing section e) and the cooling section f) are arranged downstream of the feed section a), of the heating section b) and of the pressurizing section c), and wherein the blowing agent supply line d) has one or more discharge end(s), which is/are connected with one or more of the pressurizing section c), the mixing section e) and the cooling section f).

The 3D printing system in accordance with embodiments of the present invention does not deposit a polymer strand, which has subsequently to be injected with blowing agent and then foamed, onto the target surface. Rather, the 3D printing system in accordance with embodiments of the present invention deposits onto the target surface a strand of a mixture of polymer including blowing agent. After having been fed into the feed section a) of the printing device, the polymer is molten in the heating section b) and pressurized in the pressurizing section c), before blowing agent is injected via the blowing agent supply line d) into the pressurized polymer melt. Due to the applied pressure, the expandable pressurized polymer melt does not expand or foam, respectively, in this section of the printing device. Subsequently, the expandable pressurized polymer melt is mixed and cooled, before it is deposited onto the target surface by pressing it through the die of the terminal printing head section of the printing device. In dependency of, among others, the flow rate of the mixture adjusted in the printing device and of the temperature adjusted in the cooling section a strand of expandable polymer, of expanding polymer or of expanded polymer is deposited onto the target surface. If the temperature of the mixture is sufficiently low in the terminal printing head section, the mixture will only expand or foam, respectively, after leaving the terminal printing head section, when it is subjected to the ambient temperature outside the printing device, so that a strand of expandable polymer, i.e. of non-expanded polymer, is deposited, which expands during the deposition or immediately thereafter on the surface. However, if the temperature of the mixture in the terminal printing head section is higher, then the mixture will already expand or foam, respectively, when leaving the terminal printing head section (so that a strand of expanding polymer is deposited) or even before leaving the terminal printing head section (so that a strand of already expanded polymer is deposited). Thus, the 3D printing system in accordance with the present invention is very flexible in this regard. In addition, the 3D printing system in accordance with embodiments of the present invention enables a change in the concentration of blowing agent in the mixture of polymer including a blowing agent in the printing device, enables a change in the temperature of the mixture in the printing device by changing the temperature of the cooling section, enables a change in the flow rate of the mixture through the printing device and enables a change in the typre of polymer being fed into the printing device over the time.

On account of these reasons, the 3D printing system in accordance with embodiments of the present invention enables control of the foam structure and the density of the foamed product at discretion. Moreover, it enables production of the hybrid articles comprising foamed sections and non-foamed sections, by temporarily stopping the addition of blowing agent into the polymer melt. All in all, embodiments of the present invention provide a 3D printing system and a method for preparing a three-dimensional object made at least partially of an expanded polymer, which is more flexible and which particularly enables the control of the foam structure and the density of the foamed product and enables the production of hybrid articles comprising foamed sections and non-foamed sections.

In principle, embodiments of the present invention are not particularly limited concerning the form of the printing device and its sections. Thus, one or more of the sections can have e.g. a square, a rectangular, an ellipsoid or a circular cross-section, wherein the dimensions of the single sections can be the same or different to each other. Good results are in particular obtained, when one or more of the feed section a), of the heating section b), of the mixing section e) and of the cooling section f) have a circular cross-section and are thus (seen three-dimensionally) tubular. Each of the sections can have the same inner diameter or a different inner diameter of, for instance, 1 to 10 mm or of 2 to 4 mm. More preferably, all of at least the feed section a), of the heating section b), of the mixing section e) and of the cooling section f) are tubular sections having the same inner diameter, which is preferably between 1 and 10 mm and more preferably between 2 and 4 mm.

Also, embodiments of the present invention are in principle not particularly limited concerning the order of the single sections of the printing device as long as the mixing section e) and the cooling section f) are arranged downstream of the feed section a), of the heating section b) and of the pressurizing section c) and as long as the blowing agent supply line d) has one or more discharge end(s), which is/are connected with one or more of the pressurizing section c), of the mixing section e) and of the cooling section f). Section denotes in this context a longitudinal segment, i.e. a segment extending in the longitudinal direction of the printing device.

In accordance with one particular preferred embodiment of the present invention, the sections a) to c) and e) to g) are arranged in this order from the upstream end to the downstream end of the printing device.

Alternatively, the sections a) to c) and e) to g) are arranged from the upstream end to the downstream end of the printing device in the order: feed section a) followed by the pressurizing section c) followed by the heating section b) followed by the mixing section e) followed by the cooling section f) followed by the terminal printing head section g).

In accordance with still an alternative embodiment of the present invention, the sections a) to c) are combined to one section, i.e. the feed section a) is embodied so as to be also the heating section b) and the pressurizing section c). Downstream of this combined section a), b), c) follows then the mixing section e) followed by the cooling section f) followed by the terminal printing head section g).

Still alternatively, the sections e) and f) are combined to one section, i.e. the mixing section e) is embodied so as to be also the cooling section f). This embodiment is compatible with the aforementioned embodiment, according to which the sections a) to c) are combined to one section, so that the printing device of this embodiment of the present invention comprises a combined feed, heating and pressurizing section a), b), c) and downstream thereof a combined mixing and cooling section e), f). Alternatively, the sections a), b) and c) can be different, so that the printing device comprises an upstream feed section a), downstream thereof a heating section b), downstream thereof a pressurizing section c), downstream thereof a combined mixing and cooling section e), f) and downstream thereof the terminal printing head section g).

The feed section a) is in its simplest embodiment the tubular end section of a pipe.

In order to form the heating section, the respective section of the printing device can include any means or device, which is able to heat a polymer being present in the pipe so that it melts. For instance, the respective section of the printing device can include an active heating element, such as a Peltier element or a resistance heater, or with a heat exchanger. More specifically, a Peltier element, a resistance heater or a heat exchanger can be provided on the outer wall of the heating section, which is in particular preferred, if the heating section b) of the printing device is a tubular section so that the Peltier element, the resistance heater or the heat exchanger is disposed on the outer wall of the tube.

It is suggested in a further development of the embodiments of the present invention to arrange a cooling section between the feed section a) and the heating section b). This allows reliably avoiding that the polymer is molten in the feed section a) due to the heat transferred into the polymer in the downstream heating section b). The cooling section can be a tubular section comprising a tube, wherein a Peltier element, a heat exchanger or preferably cooling fins are disposed on the outer wall of the tube.

Also concerning the pressurizing section c), the present invention is not particularly limited. Thus, the pressurizing section c) can be formed by any means or device, which is able to pressurize a polymer being present in the pipe either in the form of a solid (if the heating section b) is downstream of the pressurizing section c)) or preferably in the form of a melt (if the heating section b) is upstream of the pressurizing section c)). Preferably, the pressurizing section c) comprises a piston compressor, a screw compressor or a gear compressor. If the pressurizing section c) is arranged downstream of the heating section b), it is further preferred that the pressurizing section c) comprises a heating element in order to avoid that the polymer melt flowing through the pressurizing section c) solidifies. The heating element disposed in the pressurizing section c) can be a Peltier element, a resistance heater or a heat exchanger.

As set out above, in accordance with an embodiment of the present invention the blowing agent supply line d) has one or more discharge end(s), which is/are connected with one or more of the pressurizing section c), of the mixing section e) and of the cooling section f). Thus, the blowing agent supply line d) can comprise three discharge ends, one of which being connected with the pressurizing section c), the other of which being connected with the mixing section e) and the other of which being connected with the cooling section f). Alternatively, the blowing agent supply line d) can comprise two discharge ends, one of which being connected with the mixing section e) and the other of which being connected with the cooling section f). Still alternatively and actually preferred, the blowing agent supply line d) comprises one discharge end, which is connected with the mixing section e) and more preferably with the upstream part of the mixing section e). The latter embodiment is particularly preferred, when the mixing section e) is arranged upstream of the cooling section f). If the cooling section f) is arranged upstream of the mixing section e), the blowing agent supply line d) can have one discharge end, which is connected with the cooling section f).

In a further development of the an embodiment of the present invention, it is suggested that the mixing section e) comprises one or more static mixers. Even if in principle also dynamic mixers, such as an extruder or kneader, can be used, it is actually preferred to use one or more static mixers. This is preferred, because then moving or rotating elements, respectively, as they are integral component of a dynamic mixer, are absent. On account thereof, less maintenance is necessary. Moreover, static mixers can be embodied small enough so that they can be integrated into a tube with an inner diameter of 1 to 10 mm and preferably of 2 to 4 mm.

The cooling section f) can have e.g. a square, a rectangular, an ellipsoid or a circular cross-section. However, it is preferred that the cooling section f) is a tubular section, which comprises a tube, wherein a Peltier element, a heat exchanger or cooling fins are disposed on the outer wall of the tube. More preferably, the inner diameter of the tubular cooling section f) is 1 to 10 mm and particularly preferred 2 to 4 mm.

In accordance with another particularly preferred embodiment of the present invention, the printing head section g) is a tapered tubular section, wherein the downstream part of the printing head section g) is tapered so as to form the die. Preferably, the upstream part of the printing head section g) has the same inner diameter as at least one of the feed section a), of the heating section b), of the mixing section e) and of the cooling section f) and more preferably has preferably the same inner diameter as all of the feed section a), of the heating section b), of the mixing section e) and of the cooling section f). The die has preferably an inner diameter of 0.1 to 1.0 mm and more preferably of 0.1 to 0.5 mm.

According to another aspect, the present invention relates to a method for preparing a three-dimensional object made at least partially of an expanded polymer, wherein the method is performed in the aforementioned three-dimensional printing system.

Preferably, the method comprises the following steps:
a) melting a polymer so as to obtain a polymer melt,
b) pressurizing the polymer melt so as to obtain a pressurized polymer melt,
c) dosing at least one blowing agent into the pressurized polymer melt so as to obtain an expandable pressurized polymer melt,
d) homogenizing the expandable pressurized polymer melt by passing it through at least one mixer and preferably by passing it through at least one static mixer so as to obtain a homogenized expandable pressurized polymer melt,
e) cooling the homogenized, expandable pressurized polymer melt so as to obtain a cooled homogenized expandable pressurized polymer mixture and
f) shaping, depositing and foaming the cooled homogenized expandable pressurized polymer mixture by extruding it through the die of the printing device.

In alternative embodiments, the order of the aforementioned steps is changed. For instance, steps a) and b) can be performed simultaneously by extruding the polymer through a combined feed, heating and pressurizing section a), b), c).

Also steps d) and e) can be performed simultaneously by extruding the expandable pressurized polymer melt polymer through a combined mixing and cooling section e), f).

Both aforementioned embodiments can be combined so that steps a) and b) are performed simultaneously by extruding the polymer through a combined feed, heating and pressurizing section a), b), c) and steps d) and e) are performed simultaneously by extruding the expandable pressurized polymer melt polymer through a combined mixing and cooling section e), f). In this embodiment, the method comprises the steps: i) melting and pressurizing a polymer so as to obtain a pressurized polymer melt, ii) dosing at least one blowing agent into the pressurized polymer melt so as to obtain an expandable pressurized polymer melt, iii) homogenizing and cooling the expandable pressurized polymer melt and iv) shaping, depositing and foaming the cooled, homogenized, expandable pressurized polymer mixture by extruding it through the die of the printing device.

In still an alternative embodiment, in the aforementioned embodiment comprising the steps a) to f), step b) can be performed before step a), so that firstly the polymer is pressurized, before the pressurized polymer is molten.

In still an alternative embodiment, in the aforementioned embodiment comprising the steps a) to f), step be) can be performed before step d), so that firstly the expandable pressurized polymer melt is cooled, before the cooled expandable pressurized polymer melt is mixed.

Both aforementioned embodiments can be combined so that the method comprises the following steps:
a) pressurizing the polymer so as to obtain a pressurized polymer,
b) melting the pressurized polymer so as to obtain a pressurized polymer melt,
c) dosing at least one blowing agent into the pressurized polymer melt so as to obtain an expandable pressurized polymer melt,
d) cooling the expandable pressurized polymer melt so as to obtain a cooled expandable pressurized polymer mixture and
e) homogenizing the cooled expandable pressurized polymer mixture by passing it through at least one mixer and preferably by passing it through at least one static mixer so as to obtain a cooled homogenized expandable pressurized polymer mixture,
f) shaping, depositing and foaming the cooled homogenized expandable pressurized polymer mixture by extruding it through the die of the printing device.

In order to adjust the size of the bubbles formed by the blowing agent during the expansion, it is suggested in a further development of the embodiments of the present invention that at least one nucleating agent is added to the polymer, wherein the at least one nucleating agent is preferably added before the melting step a) and/or after the melting step a), but before the homogenizing step e).

Good results are in particular obtained, when the nucleating agent is selected from the group consisting of talc, waxes, graphite, bentonites and arbitrary combinations of two or more of the aforementioned compounds.

Embodiments of the present invention can be performed with any foamable polymer. Suitable examples therefore are polymers being selected from the group consisting of thermoplastic polyurethanes, polyolefins (such as polyethylenes or polypropylenes), polyesters (such as polyethylene terephthalates), ethylene vinylacetate copolymers, ethylene butyl acrylate copolymers, polystyrenes, polylactic acids, thermoplastic elastomers, nitrile rubbers, copolymers of acrylonitrile and butadiene, polychloroprenes, polyimides, polyvinyl chlorides and arbitrary combinations of two or more of the aforementioned polymers.

The polymer can enter the feed section a) of the printing device in any form, such as in particular in form of a polymer melt, of polymer granulates, of polymer pellets, of a polymer filament or of a polymer wire, respectively.

Even if embodiments of the present invention can be performed with one or more chemical blowing agents, it is particularly preferred that the blowing agent used in the method in accordance with embodiments of the present invention is a physical blowing agent. Preferred examples for the physical blowing agent are those selected from the group consisting of carbon dioxide, nitrogen, water, cyclopentane, isobutane, pentane and arbitrary combinations of two or more of the aforementioned compounds.

Depending on the kind of polymer applied, the expandable pressurized polymer melt obtained in step c) can have a temperature of 60 to 270° C. and is pressurized to 2 to 50 MPa.

For instance, if the polymer is a thermoplastic polyurethane, the expandable pressurized polymer melt obtained in step c) has preferably a temperature of 100 to 180° C. and is pressurized to 2 to 50 MPa.

However, if the polymer is a polyolefin, such as a polyethylene or a polypropylene, it is preferred that the expandable pressurized polymer melt obtained in step c) has a temperature of 60 to 120° C. and is pressurized to 2 to 50 MPa.

In accordance with a further aspect, embodiments of the present invention relate to a three-dimensional object, which is obtainable with the aforementioned method. The three-dimensional object can be in particular an acoustic insulating material, a cushioning, a mattress, a mat, a sponge, a shoe sole, a sports shoe, a protective equipment, a support structure or a filling structure.

A specific embodiment in accordance with the present invention is subsequently described with reference to the appended FIG. 1.

BRIEF DESCRIPTION OF DRAWINGS

The invention will be explained in more detail hereinafter with reference to the drawings.

DETAILED DESCRIPTION

Figure 1:
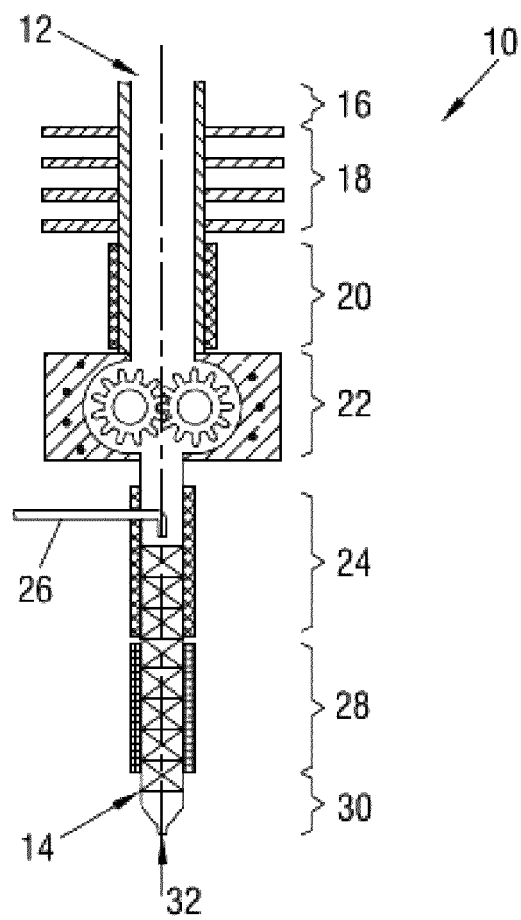
FIG. 1 shows a schematic cross-section of a printing device for preparing an expandable polymer melt and for depositing a strand of the expandable, expanding or expanded polymer onto a surface of a 3D printing system for preparing a three-dimensional object made at least partially of an expanded polymer in accordance with one exemplary embodiment of the present invention.

The printing device 10 shown in FIG. 1 comprises from its upstream end 12 to its downstream end 14 the following sections in this order:
i) a feed section 16,
ii) a cooling section 18
iii) a heating section 20,
iv) a pressurizing section 22,
v) a mixing section 24,
vi) a cooling section 28 and
vii) a terminal printing head section 30 at the downstream end of the printing device including a die 32 for depositing the strand of expandable, expanding or expanded polymer onto the surface wherein a blowing agent supply line 26 having a discharge end is provided, which is connected with the upper part of the mixing section 24.

While the feed section 16 is the upstream tubular end section of the printing device 10, the cooling section 18 is embodied as a tubular section disposed on the outer wall thereof with cooling fins. The heating section 20 is a tubular section comprising Peltier elements on the outer tube wall, whereas the pressurizing section 22 comprises a screw compressor. The mixing section 24 is a tubular section comprising a static mixer, whereas the cooling section 28 is a tubular section, the outer wall thereof being provided with Peltier elements.

During operation, a method for preparing a three-dimensional object made at least partially of an expanded polymer is performed, which comprises the following steps:
i) feeding a polymer into the feed section 16,
ii) cooling the polymer in the cooling section 18 so as to avoid a melting already in the feed section 16,
iii) melting the polymer in the heating section 20 so as to obtain a polymer melt,
iv) pressurizing the polymer melt in the pressurizing section 22 so as to obtain a pressurized polymer melt,
v) dosing at least one blowing agent through the gas supply line 26 into the pressurized polymer melt in the upstream part of the mixing section 24 so as to obtain an expandable pressurized polymer melt,
vi) homogenizing the expandable pressurized polymer melt by passing it through the mixer provided in the mixing section 24 so as to obtain a homogenized expandable pressurized polymer melt,
vii) cooling the homogenized, expandable pressurized polymer melt in the cooling section 28 so as to obtain a cooled homogenized expandable pressurized polymer mixture and
viii) shaping, depositing and foaming the cooled homogenized expandable pressurized polymer mixture by extruding it through the die 32 of the printing head section 30 of the printing device 10.

Subsequently, the present invention is further illustrated by non-limiting examples.

Example 1

The hot end (printing head) of a 3D printer was constructed in accordance with an embodiment of the present disclosure to directly solubilize blowing agent into the molten polymer. The inner diameter of the melting section was 1.7 mm. The blowing agent was pumped by means of a HPLC pump into the blowing agent supply line. The mixture of molten polymer and blowing agent passed through a static mixer (4 elements of SMX DN3), where the blowing agent was homogenized with the polymer. Finally, the impregnated melt passed through a standard 0.4 mm printing nozzle. The melting section and the blowing agent injection were heated by an electrically heated aluminum block, while the static mixer was cooled by an aluminum block without heating cartridge (heat dissipation to the environment). Both heating blocks were heated to the same temperature.

The printing conditions were as follows:
Filament: Pro Fill PET from 3D-Printerstore.ch
Printing temperature: 205° C.
Extrusion speed: 15 mm/min (times 0.6 with blowing agent)
Blowing agent: Acetone (0.005 ml/min)
Blowing agent content (17% w/w)

Figure 2:
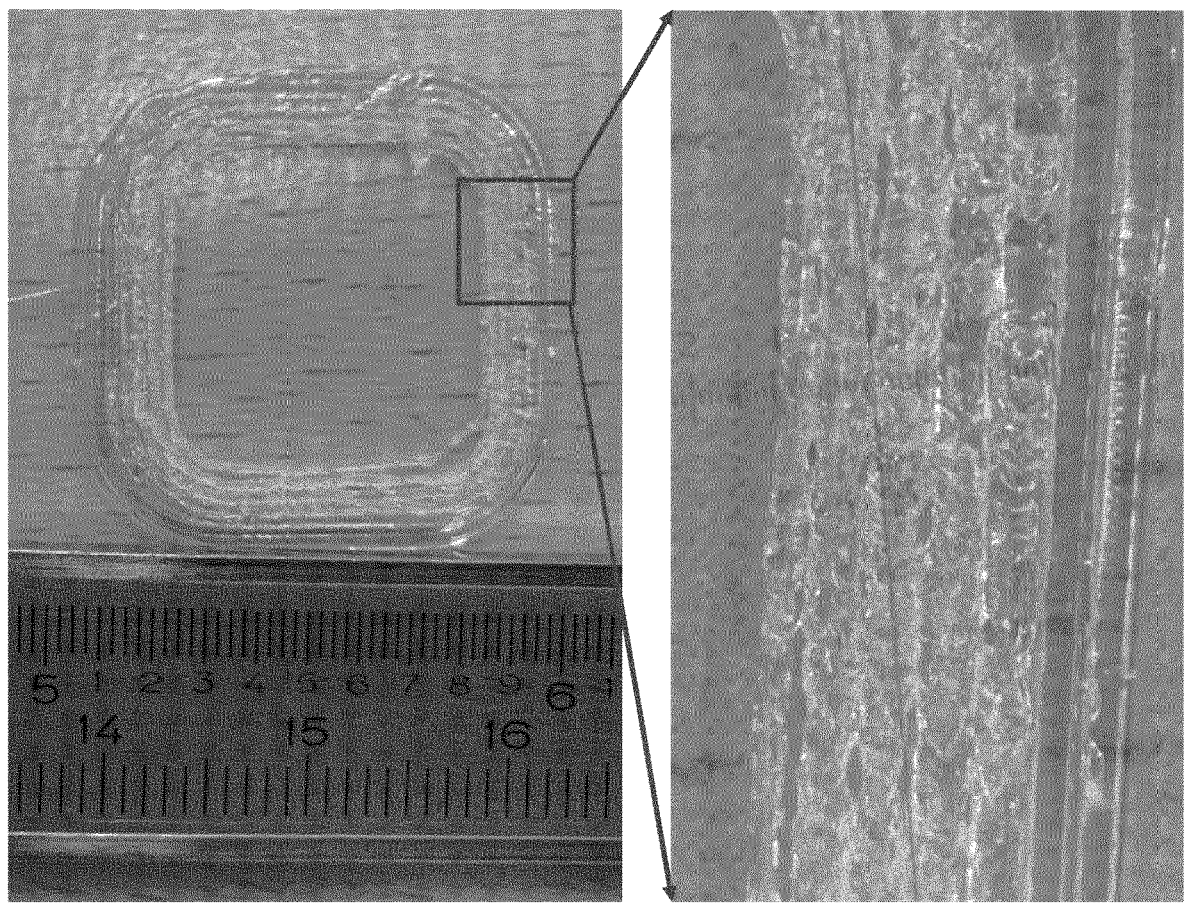
FIG. 2 shows a square monolayer of PET obtained in example 1.

FIG. 2 displays a square monolayer of PET. The printing proceeded from the outside to the inside, i.e. the outer rounds of strand were laid down first. During the third round the blowing agent flow was started and the extrusion speed reduced by 40%. The strand of the first two round were transparent and clear, while the next strands clearly contain bubbles caused by the blowing agent.

In the performed test, the foaming process was stable; the polymer filament foamed constantly as function of time, without visible change in size and/or flow rate.

The dimensional precision on the final object was not visually affected by the foaming process. In order to compensate the decrease of density, the flow rate was decreased during printing the foamed object.

A good adhesion among the layers in the foamed objects was observed and could be confirmed by squeezing the foamed objects manually.

Example 2

Figure 3:
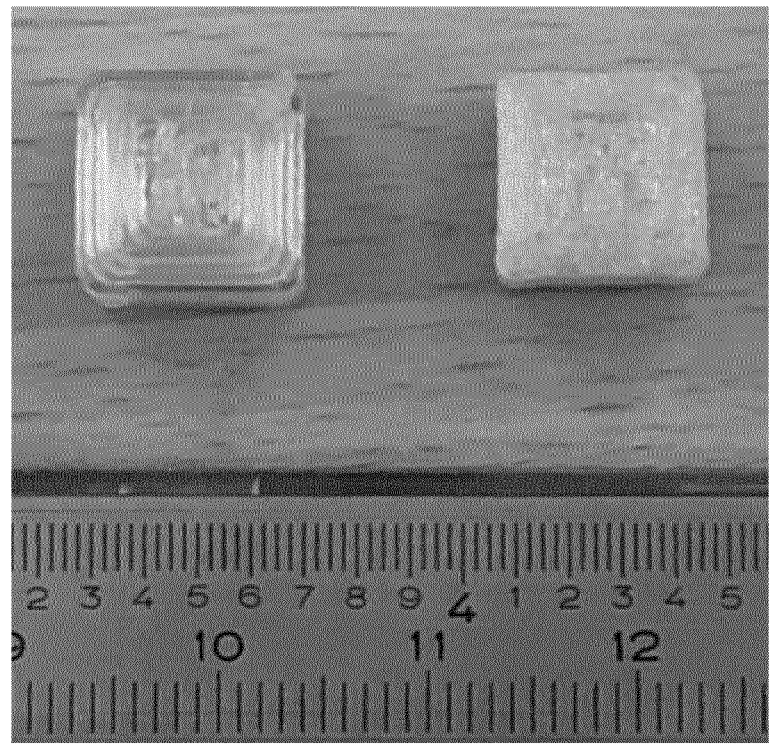
FIG. 3 shows the two PET cubes obtained in example 2.

Two PET cubes printed with the same printing nozzle movement were shown in FIG. 3. The left cube was printed without adding blowing agent while the right cone was printed with 17% blowing agent and a filament extrusion speed reduced by a factor of 0.6. The foamed cube was 35% lighter than the cube printed without blowing agent. As in the monolayer above the bubbles in the strands were visible.

Figure 4:
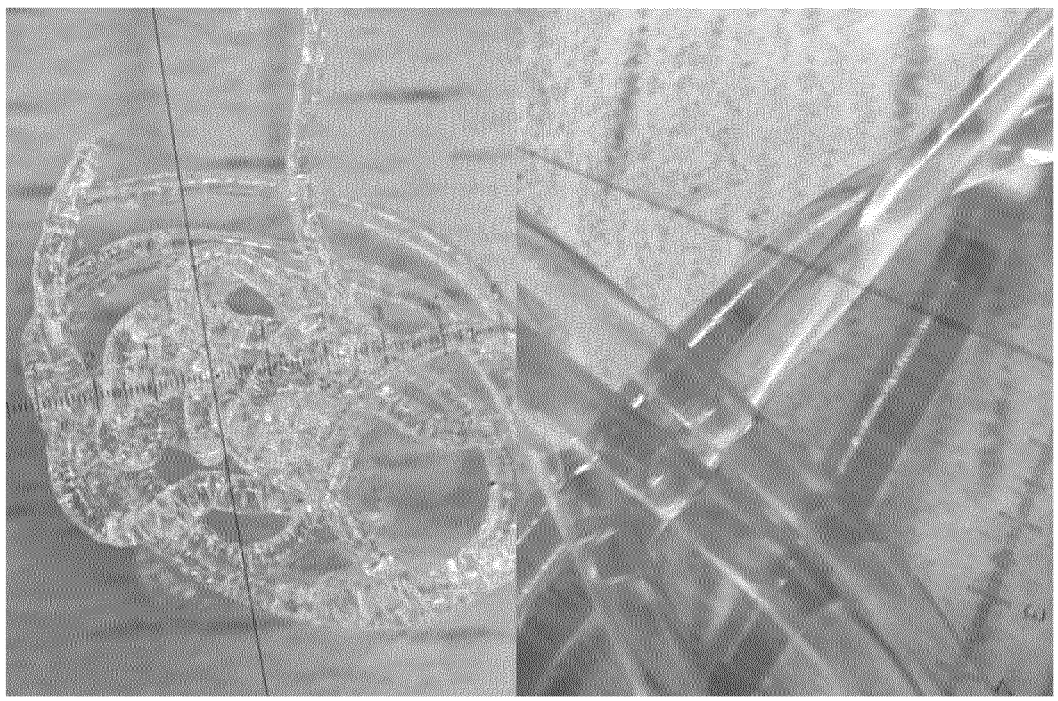
FIG. 4 shows magnified pictures of the strand which was extruded through the printing nozzle in example 2.

FIG. 4 shows magnified pictures of the strand which was extruded through the printing nozzle. On the right PET filament was extruded without adding a blowing agent with an extrusion speed of 15 mm/min. The strand was clear and homogeneous, there were no bubbles visible. On the left the PET was extruded with 9 mm/min and acetone as blowing agent was added. Due to the blowing agent the strand was now containing bubbles, i.e. it was foamed.

In the performed test the foaming process was stable; the polymer filament foamed constantly as function of time, without visible change in size and/or flow rate.

The dimensional precision on the final object was not visually affected by the foaming process. In order to compensate the decrease of density, the flow rate was decreased during printing the foamed object.

A good adhesion among the layers in the foamed objects was observed and could be confirmed by squeezing the foamed objects manually.

The invention claimed is:
1. A three-dimensional printing system for preparing a three-dimensional object made at least partially of an expanded polymer, comprising:
a printer configured to prepare an expandable polymer melt and deposit a strand of expandable, expanding or expanded polymer onto a surface, the printer comprising:
a feed section at an upstream end of the printer,
a heating section,
a pressurizing section,
a blowing agent supply line arranged downstream of the heating section and the pressurizing section,
a mixing section,
a cooling section, and
a terminal printing head section at a downstream end of the printer including a die configured to deposit the strand of the expandable, expanding or expanded polymer onto the surface,
the mixing section and the cooling section being arranged downstream of: the feed section, the heating section, and the pressurizing section, the blowing agent supply line having at least one discharge end connected with at least one of: the pressurizing section, the mixing section and the cooling section, the cooling section being a tubular section, which comprises a tube, and a Peltier element, a resistance heater, a heat exchanger or cooling fins disposed on an outer wall of the tube, and the pressurizing section comprising a piston compressor, a screw compressor or a gear compressor.

2. The three-dimensional printing system in accordance with claim 1, wherein each of the feed section, the heating section, the mixing section and the cooling section is a tubular section having a same inner diameter between 1 mm and 10 mm.

3. The three-dimensional printing system in accordance with claim 1, wherein:

the feed section, the heating section, the pressurizing section, the mixing section, cooling section and the printing head are arranged in this order from the upstream end to the downstream end of the printer, or the feed section, the heating section, the pressurizing section, the mixing section, cooling section and the printing head are arranged from the upstream end to the downstream end of the printer in the following order: feed section followed by the pressurizing section followed by the heating section followed by the mixing section followed by the cooling section followed by the printing head section, or the feed, heating and pressurizing sections are combined into one section, which is followed by the mixing section which is followed by the cooling section which is followed by the printing head section.

4. The three-dimensional printing system in accordance with claim 1, wherein the heating section is a tubular section comprising a tube, and cooling fins are disposed on the outer wall of the tube.

5. The three-dimensional printing system in accordance with claim 1, wherein a wall of the pressurizing section comprises a heating element selected from the group consisting of: a Peltier element, a resistance heater and a heat exchanger.

6. The three-dimensional printing system in accordance with claim 1, wherein the cooling section is arranged downstream of the mixing section, and the blowing agent supply line has a first discharge end that is connected with the mixing section.

7. The three-dimensional printing system in accordance with claim 1, wherein the cooling section is arranged upstream of the mixing section, and the blowing agent supply line has a first discharge end that is connected with the cooling section or with the mixing section.

8. The three-dimensional printing system in accordance with claim 1, wherein the printing head section is a tapered tubular section, the downstream end of the printing head section is tapered so as to form the die, and the upstream end of the printing head section has the same inner diameter as at least one of: the feed section, the heating section, the mixing section, and the cooling section.

9. A method for preparing a three-dimensional object made at least partially of an expanded polymer, the method comprising:

preparing the object in the three-dimensional printing system in accordance with claim 1.

10. The method in accordance with claim 9, wherein the method comprises:

melting the polymer so as to obtain the polymer melt, pressurizing the polymer melt so as to obtain a pressurized polymer melt, dosing at least one blowing agent into the pressurized polymer melt so as to obtain an expandable pressurized polymer melt, homogenizing the expandable pressurized polymer melt by passing the polymer melt through at least one mixer and by passing the polymer melt through at least one static mixer so as to obtain a homogenized expandable pressurized polymer melt, cooling the homogenized, expandable pressurized polymer melt so as to obtain a cooled homogenized expandable pressurized polymer mixture, and shaping, depositing and foaming the cooled homogenized expandable pressurized polymer mixture by extruding the cooled homogenized expandable pressurized polymer mixture through the die of the printer.

11. The method in accordance with claim 9, wherein at least one nucleating agent is added to the polymer, and the at least one nucleating agent is added before the melting the polymer or after the melting the polymer, but before the homogenizing the expandable pressurized polymer melt or before the melting the polymer and after the melting the polymer, but before the homogenizing the expandable pressurized polymer melt.

12. The method in accordance with claim 9, wherein the polymer is selected from the group consisting of: thermoplastic polyurethanes, polyolefins, polyesters, ethylene vinylacetate copolymers, ethylene butyl acrylate copolymers, polystyrenes, polylactic acids, thermoplastic elastomers, nitrile rubbers, copolymers of acrylonitrile and butadiene, polychloroprenes, polyimides, polyvinyl chlorides and combinations of two or more of the aforementioned polymers.

13. The method in accordance with claim 9, wherein the blowing agent is a physical blowing agent.

14. The method in accordance with claim 9, wherein the expandable pressurized polymer melt has a temperature of 60 to 270° C. and is pressurized to 2 MPa to 50 MPa.

* * * * *